(12) United States Patent
Petschnigg et al.

(10) Patent No.: US 11,200,712 B2
(45) Date of Patent: *Dec. 14, 2021

(54) METHODS AND APPARATUS FOR PROVIDING A DIGITAL ILLUSTRATION SYSTEM

(71) Applicant: WETRANSFER B.V., Amsterdam (NL)

(72) Inventors: Georg Petschnigg, New York, NY (US); Andrew Allen, Norwalk, CT (US); Julian Walker, Jersey City, NJ (US)

(73) Assignee: WETRANSFER B.V., Amsterdam (NL)

(*) Notice: Subject to any disclaimer, the term of this patent is extended or adjusted under 35 U.S.C. 154(b) by 87 days.

This patent is subject to a terminal disclaimer.

(21) Appl. No.: 15/353,363

(22) Filed: Nov. 16, 2016

(65) Prior Publication Data

US 2017/0124735 A1    May 4, 2017

Related U.S. Application Data

(63) Continuation of application No. 13/850,103, filed on Mar. 25, 2013, now Pat. No. 9,529,486.
(Continued)

(51) Int. Cl.
*G06T 11/20* (2006.01)
*G06T 11/00* (2006.01)
(Continued)

(52) U.S. Cl.
CPC ............ *G06T 11/203* (2013.01); *G06F 3/048* (2013.01); *G06T 11/00* (2013.01); *G06T 11/001* (2013.01); *G06T 11/80* (2013.01)

(58) Field of Classification Search
CPC ......... G06T 5/002; G06T 11/005; G06T 1/60; G06T 3/4015; G06T 5/007; G06T 5/50; G06T 7/20; G06T 7/90
See application file for complete search history.

(56) References Cited

U.S. PATENT DOCUMENTS

| 5,347,589 A | * | 9/1994 | Meeks | ............... G06K 9/00154 |
| | | | | 178/18.01 |
| 5,347,620 A | * | 9/1994 | Zimmer | ............. G06F 3/04845 |
| | | | | 101/492 |

(Continued)

OTHER PUBLICATIONS

Non-Final Office Action for U.S. Appl. No. 13/850,103, filed Mar. 25, 2013, and mailed from the USPTO dated Jan. 11, 2016, 24 pgs.
(Continued)

*Primary Examiner* — Phenuel S Salomon
(74) *Attorney, Agent, or Firm* — Stoel Rives LLP

(57) ABSTRACT

A non-transitory processor-readable medium storing code representing instructions to be executed by a processor to receive a set of data elements associated with a user-defined content having a content type. The processor interpolates the set of data elements to produce a first set of content data based on a filter domain associated with the user-defined content. The processor further refines the first set of content data based, at least in part, on the content type to produce a second set of content data. The processor also sends a signal representing the second set of content data such that the user-defined content is displayed based on the second set of content data.

14 Claims, 9 Drawing Sheets

Related U.S. Application Data

(60) Provisional application No. 61/617,614, filed on Mar. 29, 2012.

(51) Int. Cl.
*G06T 11/80* (2006.01)
*G06F 3/048* (2013.01)

(56) References Cited

U.S. PATENT DOCUMENTS

| | | | | |
|---|---|---|---|---|
| 5,408,593 | A * | 4/1995 | Kotaki | G06F 3/04845 345/422 |
| 5,717,848 | A * | 2/1998 | Watanabe | G06T 13/20 345/474 |
| 6,373,490 | B1 * | 4/2002 | Bendiksen | G06T 11/001 345/441 |
| 7,079,153 | B2 * | 7/2006 | Derry | G06F 9/451 345/594 |
| 8,605,095 | B2 * | 12/2013 | DiVerdi | G06T 11/001 345/441 |
| 9,529,486 | B2 | 12/2016 | Petschnigg et al. | |
| 2003/0098872 | A1 * | 5/2003 | Georgiev | G06T 3/0093 345/647 |
| 2003/0107558 | A1 * | 6/2003 | Bryborn | G06K 9/22 345/179 |
| 2003/0214531 | A1 * | 11/2003 | Chambers | G06F 3/04883 715/764 |
| 2003/0215140 | A1 * | 11/2003 | Gounares | G06F 3/0481 382/187 |
| 2003/0217336 | A1 * | 11/2003 | Gounares | G06F 3/0481 715/268 |
| 2004/0056859 | A1 * | 3/2004 | Ohba | G06T 15/02 345/426 |
| 2004/0228532 | A1 * | 11/2004 | Fernandez | G06F 3/03545 382/187 |
| 2005/0276480 | A1 * | 12/2005 | Li | G06F 3/018 382/185 |
| 2006/0055662 | A1 * | 3/2006 | Rimas-Ribikauskas | G06F 3/017 345/156 |
| 2006/0174139 | A1 * | 8/2006 | Keely | G06F 1/3203 713/300 |
| 2006/0210958 | A1 * | 9/2006 | Rimas-Ribikauskas | G09B 7/00 434/362 |
| 2007/0115287 | A1 | 5/2007 | Sander et al. | |
| 2007/0206008 | A1 | 9/2007 | Kaufman | |
| 2008/0018650 | A1 * | 1/2008 | Sander | G06T 15/40 345/441 |
| 2008/0266309 | A1 * | 10/2008 | Sander | G06T 11/001 345/582 |
| 2010/0182328 | A1 * | 7/2010 | Pirchio | G06T 11/203 345/474 |
| 2010/0201692 | A1 | 8/2010 | Niles et al. | |
| 2011/0096002 | A1 * | 4/2011 | Koh | G06F 3/03545 345/173 |
| 2011/0304643 | A1 * | 12/2011 | Marison | G06T 11/40 345/611 |
| 2011/0314113 | A1 * | 12/2011 | Noda | G06F 3/0481 709/206 |
| 2013/0135191 | A1 * | 5/2013 | Shiokawa | G06F 3/017 345/156 |
| 2013/0229390 | A1 * | 9/2013 | DiVerdi | G06F 3/0488 345/179 |

OTHER PUBLICATIONS

Notice of Allowability for U.S. Appl. No. 13/850,103, filed Mar. 25, 2013, and mailed from the USPTO dated Aug. 29, 2016, 4 pgs.

Notice of Allowance and Fee(s) Due for U.S. Appl. No. 13/850,103, filed Mar. 25, 2013, and mailed from the USPTO dated Aug. 22, 2016, 5 pgs.

International Search Report and Written Opinion for Application No. PCT/US13/34082 filed Mar. 27, 2013, and mailed from the International Searching Authority dated Jul. 10, 2013, 10 pgs.

PCT/US13/34082, International Search Report and Written Opinion, 10 pgs. dated Jul. 10, 2013.

International Preliminary Report on Patentability for International Application No. PCT/US2013/034082 filed Mar. 27, 2013, and mailed from the International Bureau dated Oct. 9, 2014, 9 pgs.

\* cited by examiner

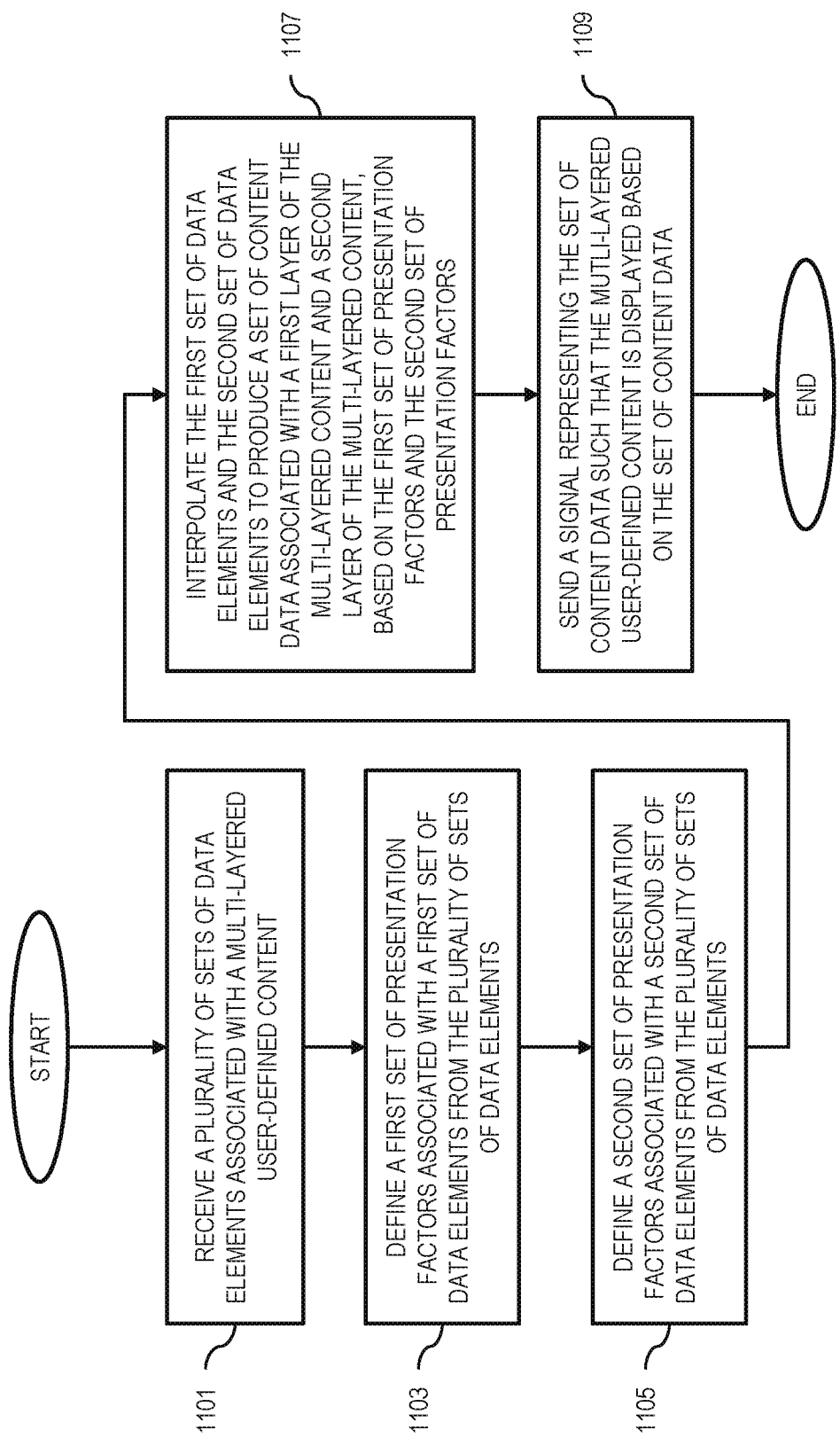

METHODS AND APPARATUS FOR PROVIDING A DIGITAL ILLUSTRATION SYSTEM

CROSS-REFERENCE TO RELATED APPLICATIONS

This application is a continuation of U.S. patent application Ser. No. 13/850,103, now published as U.S. Patent Publication No. 2013/0263027, filed Mar. 25, 2013 and titled METHODS AND APPARATUS FOR PROVIDING A DIGITAL ILLUSTRATION SYSTEM, which claims priority to U.S. Provisional Patent Application No. 61/617,614, entitled "Drawing System", filed on Mar. 29, 2012, the entire disclosure of each of which is hereby incorporated herein by reference.

BACKGROUND

Some embodiments described herein relate generally to providing graphical interfaces, and more particularly to providing a digital illustration system.

Known digital illustration systems provide software programs to be used on computing devices such as, for example, a personal computer for drawing, sketching, or writing. These digital illustration systems, mostly designed for professional artists, are generally complex, difficult to use, and have complicated settings and steep learning curves. Moreover, using these illustration software products on mobile devices such as, for example, tablet PCs and mobile phones can cause display issues because screen dimensions of such devices, as a user interfaces, are typically too small and their input is often touch-based.

Therefore, a need exists for an approach for providing digital illustration tools that overcome the shortcomings of the existing methods by simplifying the settings a user uses to learn and is designed for mobile use such as for on-screen pen and touch input.

SUMMARY

In some embodiments, a non-transitory processor-readable medium stores code representing instructions to be executed by a processor, the code comprising code to cause the processor to receive a set of data elements associated with a user-defined content having a content type. The processor is also caused to interpolate the set of data elements to produce a first set of content data based on a filter domain associated with the user-defined content. The processor is further caused to refine the first set of content data based, at least in part, on the content type to produce a second set of content data. The processor is also caused to send a signal representing the second set of content data such that the user-defined content is displayed based on the second set of content data.

BRIEF DESCRIPTION OF THE DRAWINGS

FIGS. 9-11 are flowcharts of processes for providing digital illustration functions, according to various embodiments.

DETAILED DESCRIPTION

Figure 1:
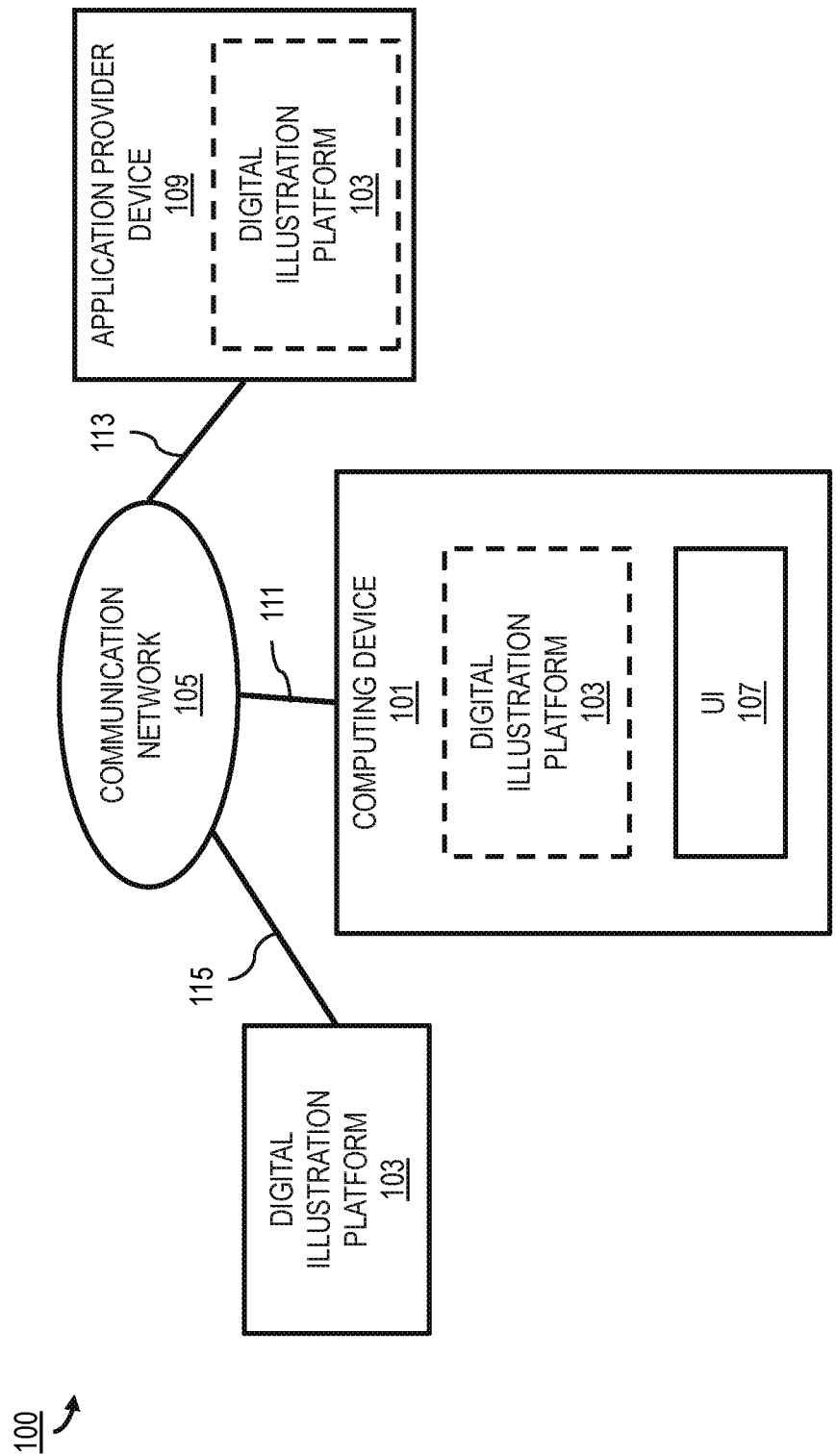
FIG. 1 is a schematic block diagram of a computer system in which digital illustration functions can be performed, according to an embodiment.

A digital illustration system, at a high level, converts input to a computing device such as, for example, personal computers, netbooks, laptops, notebooks, tablet PCs, smartphones, etc., into drawing commands or strokes on a digital display. The input typically originates by a user of the computing device using touch, stylus, pen or other input mechanisms of the computing device. Known digital illustration systems, however, fail to distinguish various semantic activities involved in illustration such as, for example, sketching, and drawing, to produce a natural user experience similar to illustrating with pen and paper.

Methods and apparatus are described herein to provide digital illustration on a computing device. In some embodiments, a non-transitory processor-readable medium stores code representing instructions to be executed by a processor, the code comprising code to cause the processor to receive a set of data elements associated with a user-defined content having a content type. The processor is also caused to interpolate the set of data elements to produce a first set of content data based on a filter domain associated with the user-defined content. The processor is further caused to refine the first set of content data based, at least in part, on the content type to produce a second set of content data. The processor is also caused to send a signal representing the second set of content data such that the user-defined content is displayed based on the second set of content data.

In some embodiments, a non-transitory processor-readable medium stores code representing instructions to be executed by a processor, the code comprising code to cause the processor to receive a set of data elements associated with a user-defined content having a content type. The processor is also caused to, for each data element from the set of data elements, define a set of presentation factors associated with that data element at least based on the content type. The processor is also caused to interpolate the set of data elements into a set of content data based on the set of presentation factors associated with each data element from the set of data elements. The processor is also caused to send a signal representing the set of content data such that the user-defined content is displayed based on the set of content data.

In some embodiments, a non-transitory processor-readable medium stores code representing instructions to be executed by a processor, the code comprising code to cause the processor to receive multiple sets of data elements associated with a multi-layered user-defined content. Each set of data elements from the multiple sets of data elements is associated with a layer of the multi-layered user-defined content. The processor is also caused to define a first set of presentation factors associated with a first set of data elements from the multiple sets of data elements and associated with a first layer of the multi-layered user-defined content.

The processor is also caused to define a second set of presentation factors associated with a second set of data elements from the multiple sets of data elements and associated with a second layer of the multi-layered user-defined content. The processor is also caused to interpolate the first set of data elements and the second set of data elements to produce a set of content data associated with the first layer of the multi-layered content and the second layer of the multi-layered content, based on the first set of presentation factors and the second set of presentation factors. The processor is also caused to send a signal representing the set of content data such that the multi-layered user-defined content is displayed based on the set of content data.

As used herein, "user" can be a person, a module, a device, or an application. In some of the embodiments discussed, a user is referred to as a person using the computing device via one or more user interfaces. Additionally/alternatively, a user can be a device, a module of a device, or an application such as, for example, art applications, computer games, simulation applications, etc., that can use the digital illustration system provided and managed by the described methods and apparatus.

As used herein, the singular forms "a," "an" and "the" include plural referents unless the context clearly dictates otherwise. Thus, for example, the term "a "user-defined content" is intended to mean a single user-defined content or a combination of user-defined contents (e.g., drawings, writings, sketches, etc.).

FIG. 1 is a schematic block diagram of a computer system in which digital illustration functions can be performed, according to an embodiment. The computer network system 100 includes at least one computing device 101, equipped with at least a user interface (UI) 107. The computer network system 100 also includes a digital illustration platform 103; and at least one application provider device 109, which can be operatively coupled to one or more computing devices 101 or other application providers via a communication network 105. Note that the digital illustration platform 103 or some of its components can be embedded within the computing device 101, or within the application provider device 109, or be external to the computing device 101 and the application provider device 109, and operatively coupled to one or more computing devices 101 or one or more application provider devices 109 via a communication network 105. Any of the devices or platforms of the computer network system 100 can be equipped with local memory/storage spaces (not shown in FIG. 1). Furthermore, the devices and platforms of the system 100 may have access to centralized or distributed memory/storage spaces (not shown in FIG. 1) through the communication network 105. Additionally, a computing device 101, a digital illustration platform 103, and an application provider device 109 each can include one or more processors, performing processes associated with the services provided to the computing devices 101 (each not shown in FIG. 1). Thus, FIG. 1 is merely an example illustrating the types of devices and platforms that can be included within a computer network system 100.

Communication network 105 can be any communication network, such as the Internet, configurable to allow the computing device 101, the digital illustration platform 103, and the application provider device 109 to communicate with communication network 105 and/or to each other through communication network 105. Communication network 105 can be any network or combination of networks capable of transmitting information (e.g., data and/or signals) and can include, for example, a telephone network, an Ethernet network, a fiber-optic network, a wireless network, and/or a cellular network.

In some instances, communication network 105 can include multiple networks operatively coupled to one another by, for example, network bridges, routers, switches and/or gateways. For example, the computing device 101 can be operatively coupled to a cellular network; the application provider device 109 and/or the digital illustration platform 103 can be operatively coupled to a fiber-optic network. The cellular network and fiber-optic network can each be operatively coupled to one another via one or more network bridges, routers, switches, and/or gateways such that the cellular network and the fiber-optic network are operatively coupled to form a communication network. Alternatively, the cellular network and fiber-optic network can each be operatively coupled to one another via one or more additional networks. For example, the cellular network and the fiber-optic network can each be operatively coupled to the Internet such that the cellular network, the fiber-optic network and the Internet are operatively coupled to form a communication network.

As illustrated in FIG. 1, the computing device 101 is operatively coupled to communication network 105 via network connection(s) 111; application provider device 109 is operatively coupled to communication network 105 via network connection(s) 113; and the digital illustration platform 103 is operatively coupled to communication network 105 via network connection(s) 115. Network connections 111, 113, and 115 can be any appropriate network connection for operatively coupling computing device 101, application provider device 109, and the digital illustration platform 103.

A network connection can be a wireless network connection such as, for example, a wireless fidelity ("Wi-Fi") or wireless local area network ("WLAN") connection, a wireless wide area network ("WWAN") connection, and/or a cellular connection. A network connection can be a wired connection such as, for example, an Ethernet connection, a digital subscription line ("DSL") connection, a broadband coaxial connection, and/or a fiber-optic connection.

As mentioned above, in some instances, a computer network system 100 can include more than one computing device 101, more than one digital illustration platform 103, and more than one application provider device 109. A computing device 101, a digital illustration platform 103, and/or an application provider device 109, can be operatively coupled to the communication network 105 by heterogeneous network connections. For example, a first computing device 101 can be operatively coupled to the communication network 105 by a WWAN network connection, another computing device 101 can be operatively coupled to the communication network 105 by a DSL network connection, and a digital illustration platform 103 can be operatively coupled to the communication network 105 by a fiber-optic network connection. The application provider device 109 can be, for example, a web server configured to provide various applications to electronic devices, such as computing device 101.

The computing device 101 can be any of a variety of electronic devices that can be operatively coupled to communication network 105. A computing device 101 can be a personal computer, a tablet computer, a personal digital assistant (PDA), a cellular telephone, a television, a portable/mobile internet device and/or some other electronic communication device. The computing device 101 can include a web browser configured to access a webpage or website hosted on or accessible via the application provider device 109 over communication network 105. The computing device 101 can be configured to support, for example, HTML using JavaScript. For example, the computing device 101 can include a web browser, such as, Firefox, Safari, Dolphin, Opera and Chrome. An Internet page or website can be accessed by a user of a web browser at a computing device 101 by providing the web browser with a reference such as a uniform resource locator (URL), for example, of a webpage. For example, a user of a computing device 101 can access an application provider device 109 via a URL designated for the application provider device 109. In some instances, computing device 101 can include specialized software for accessing a web server other than a browser, such as, for example, a specialized network-enabled application or program. In some instances, portions of a website accessible via a web server can be located in a local or remote memory space/data store accessible to the web server. A data store can be at least one of a database, a data warehouse, or a file. A computing device 101 can also include one or more user interfaces (UIs) 107 such as, for example, display monitors, digital pens, mice, touch screen controls, a keyboard and/or keypad, etc. A computing device can include various ports (e.g., a USB port), audio components, and/or video components (each not shown). A computing device 101 can be operatively coupled to communication network 105 via the UI 107 and network connection 111.

In some embodiments, the digital illustration platform 103 can be located within a computing device 101 and provide a digital illustration system to a user of the computing device 101 in a stand-alone mode (e.g., without communication with a communication network 105, with other computing devices 101 and/or with application provider devices 109). For example, a user of a computing device 101 can access the digital illustration platform 103 as a software package via an auxiliary memory device (e.g., a compact disk). The user can use services provided by the digital illustration platform 103 directly from the auxiliary memory or install the digital illustration platform 103 on the computing device 101.

Figure 2:
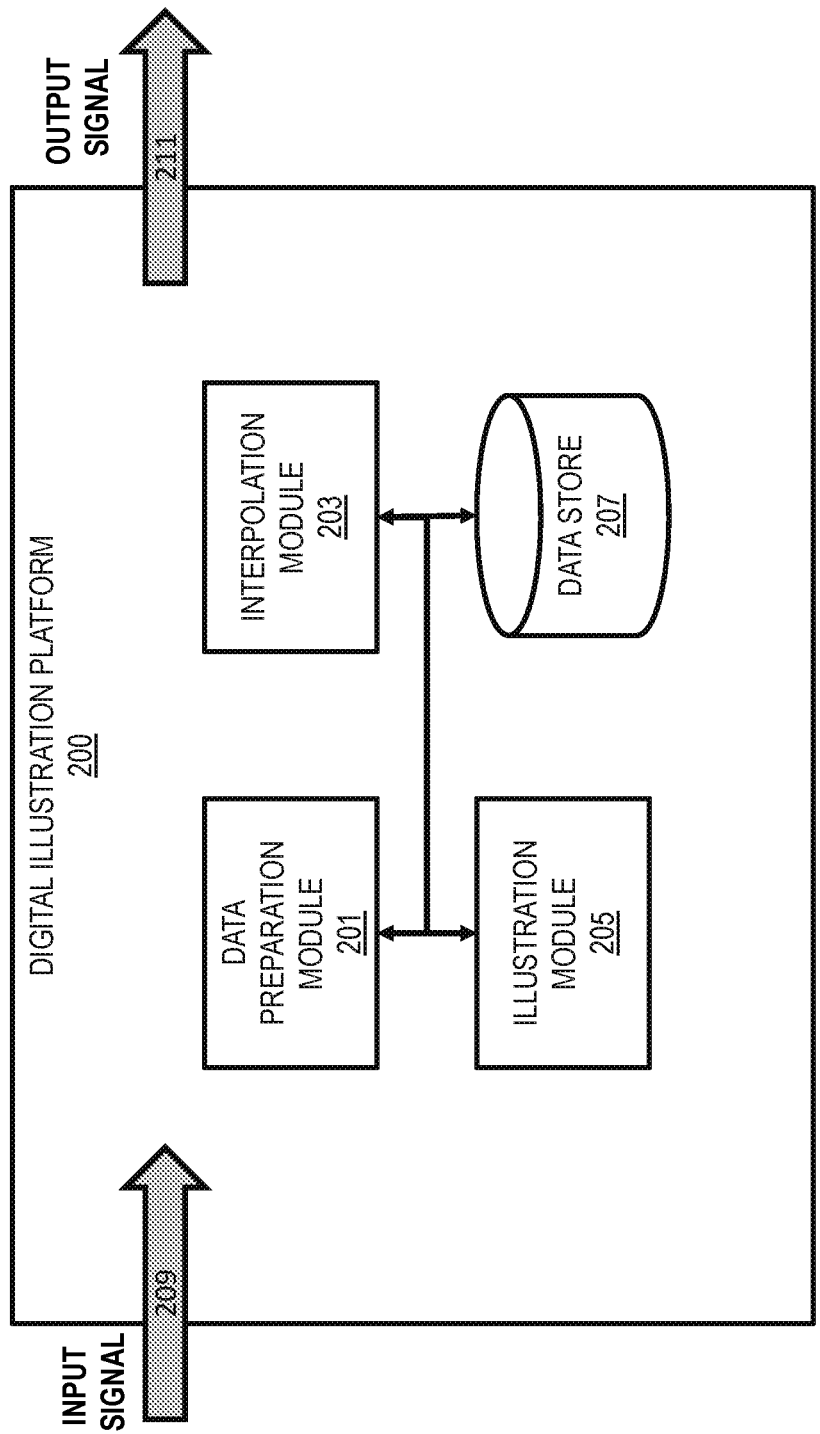
FIG. 2 is a schematic illustration of a digital illustration platform, according to an embodiment.

FIG. 2 is a schematic illustration of a digital illustration platform, according to an embodiment. Digital illustration platform 200 can be structurally and/or functionally similar to the digital illustration platform 103 of FIG. 1. As shown in FIG. 2, a digital illustration platform 200 can include a data preparation module 201, an interpolation module 203, an illustration module 205, and a data store 207. Furthermore, the digital illustration platform 200 can communicate with other components of a computer network system (e.g., computer network system 100 of FIG. 1) via input signals 209 and output signals 211.

In various instances, the digital illustration platform 200 and its modules and data store can be located anywhere within a communication network system 100 such as that shown in FIG. 1 including, but not limited to, within the computing device 101, within the application provider device 109, or in separate locations within the communication network system 100 of FIG. 1.

As used herein, a module can be, for example, any assembly and/or set of operatively-coupled electrical components, and can include, for example, a memory, a processor, electrical traces, optical connectors, software (executing or to be executed in hardware) and/or the like. Furthermore, a module can be capable of performing one or more specific functions associated with the module, as discussed further below.

The digital illustration platform 200 can provide digital illustrations on a computing device 101 via a UI 107. In some instances, the digital illustration platform 200 provides a digital illustration of a content on a UI of a computing device 101. The content can have a type such as, for example, drawing, sketching, writing, outlining, coloring, or a combination thereof.

The data preparation module 201 can receive the content (e.g., as illustration input) via the input signals 209. The illustration input can be produced by a user of a computing device 101 by, for example, drawing strokes on a touch screen 107 using a finger or a pen. Alternatively/additionally, the content can be provided by an application provider device 109, for example, based on a request from a user of the computing device 101. The content can be stored in data store 207, in a local storage of the computing device 101 (not shown in FIG. 1), or in a separate location accessible to the computing device 101 and the digital illustration platform 200 via the communication network 105.

In some embodiments, a user of a computing device 101 can produce illustration input based on a content previously stored in data store 207, in a local storage of the computing device 101 (not shown in FIG. 1), or in a separate location accessible to the computing device 101 and the digital illustration platform 200 via the communication network 105 (e.g., on a website, in cloud-based storage, etc.).

In some instances, the illustration input can be received by the data preparation module 201 as a set of data elements (e.g., pixel coordinates). The data preparation module 201 can store the set of data elements in data store 207. The set of data elements can also include various parameters associated with the data elements such as, for example, an input color, an input speed, an input pressure, an input tilt, an input angle, etc. Each data element from the set of data elements can have different parameters and/or different values for parameters. The received set of data elements can include a content type indicating, for example, a content with which the data elements from the set of data elements are associated. Content types can be, for example, lines, colors, letters, shapes, hatchings, etc. The data preparation module 201 can prepare content type, set of data elements, parameters associated with set of data elements, etc., for example by formatting, defining links, etc. The data preparation module 201 can store the prepared data in data store 207.

The interpolation module 203 interpolates the prepared data to produce interpolated data, such that the interpolated data meets an aesthetic goal that is similar to the real-world analogues of illustration activities such as, for example, working with a pen, a roller-ball, a marker or a watercolor brush. The interpolation module 203 can interpolate data elements provided by the data preparation module 201 into continuous lines, curves, shapes, colored regions, written texts, etc. In some instances, the interpolation module 203 interpolates data based on the parameters associated with the set of data elements such as, for example, pressure, tile, angle and so forth. If applicable, the set of data elements also pass through a smoothing filter to, for example, remove uneven appearances due to user's hand shaking.

The interpolation module 203 can use various filters to refine (e.g., reduce noise in) the interpolated data such as, for example, temporal filters, spatial filters, other smoothing filters, etc. For example, a spatial filter can remove data elements that are too close to each other, maintaining continuity at corners of shapes (e.g., quadratic interpolation filters, etc.). A filtering technique used by the interpolation module 203 has settings that can be modified based on the content types, data parameters, etc. For example a smoothing filter can produce a new data element ($P_{NEW}$) based on a current data element ($P_{CURRENT}$) an a previous data element ($P_{PREV}$) as follows:

$$P_{NEW}=P_{PREV}+(P_{CURRENT}-P_{PREV})*\alpha \quad (1)$$

where $P_{NEW}$, $P_{CURRENT}$, and $P_{PREV}$ are locations and $\alpha$ is a smoothing factor.

In some embodiments, a spatial spacing filter can perform the following function to calculate a distance between two consecutive data elements (e.g., $P_{NEW}$ and $P_{CURRENT}$):

Delta=0.20

RadiusMinDelta=Radius−Delta $$NextStep=\sqrt{Radius^2-RadiusMinDelta^2} \quad (2)$$

where Delta is the maximum gap between consecutive data elements given a Radius, and NextStep is the spacing distance between the current data element ($P_{CURRENT}$) and the next data element ($P_{NEW}$).

Figure 3:
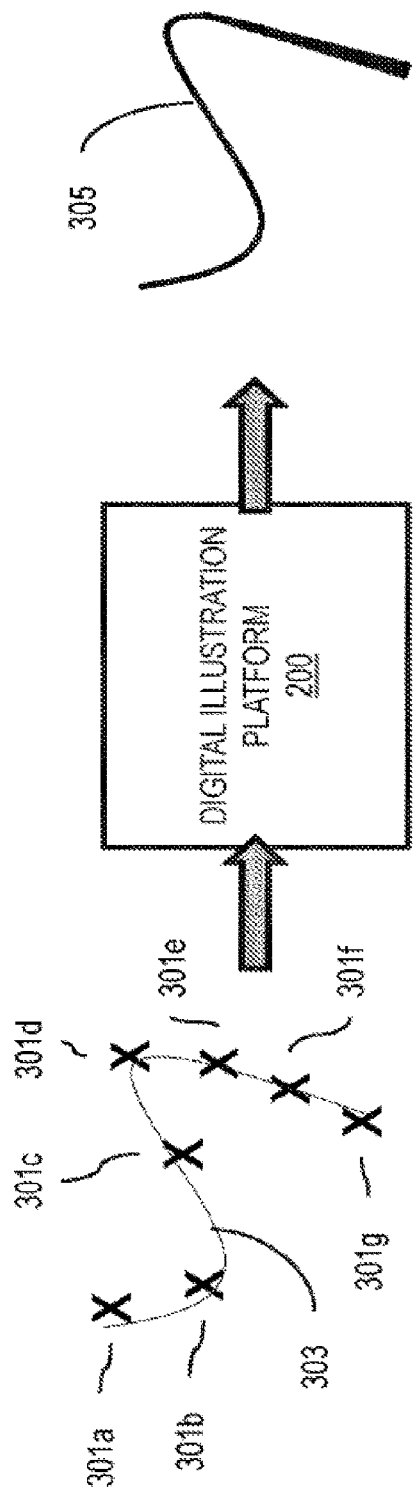
FIG. 3 is a schematic illustration of converting input data elements into a pen stroke, according to an embodiment.

FIG. 3 is a schematic illustration of converting a set of data elements into a pen stroke, according to an embodiment. In some embodiments, the digital illustration platform 200 receive a set of data elements 301a-301g from a computing device 101, from an application provider device 101, or from a different location throughout the communication network 105, as previously discussed. In the example of FIG. 3, a pressure parameter associated with the data elements 301a-301g may indicate that a pressure value associated with date elements 301a-301g is constant, while the pressure value increased for the data elements 301f and 301g.

Following this example, the data preparation module 201 can store the set of data elements' 301a-301g locations and pressure values in data store 207. The interpolation module 203 interpolates the set data elements 301a-301g into data associated with a curve (e.g., curve 303), for example, by defining a new set of data elements within the range of data elements 301a-301g. The interpolation module 203 stores data associated with curve 303 in data store 207. The illustration module 205 can modify (e.g., filters) data associated with curve 303 by producing a thicker line based on the pressure parameters associated with data elements 301a-301g and produces data associated with curve 305. The illustration module 205 can then send a signal representing data associated with curve 305 to UI 107 of a computing device 101. The illustration module 205 can also store data associated with curve 305 in data store 207 or in a local memory of the computing device 101.

In some embodiments, the illustration module 205 can perform further refinements on the interpolated set of data elements, for example, based on the content type, as described further herein with regards to FIGS. 3-8, to produce a set of data elements associated with an illustration output. The illustration module 205 can store the set of data elements associated with the illustration output on data store 207, in a local storage of the computing device 101 (not shown in FIG. 1), or in a separate location accessible to the computing device 101 and the digital illustration platform 200 via the communication network 105 (e.g., cloud-based storage). The illustration module 205 can also send a signal representing the set of data elements associated with the illustration output on the UI 107 of a computing device 101, for example via an output signal 211.

Figure 4:
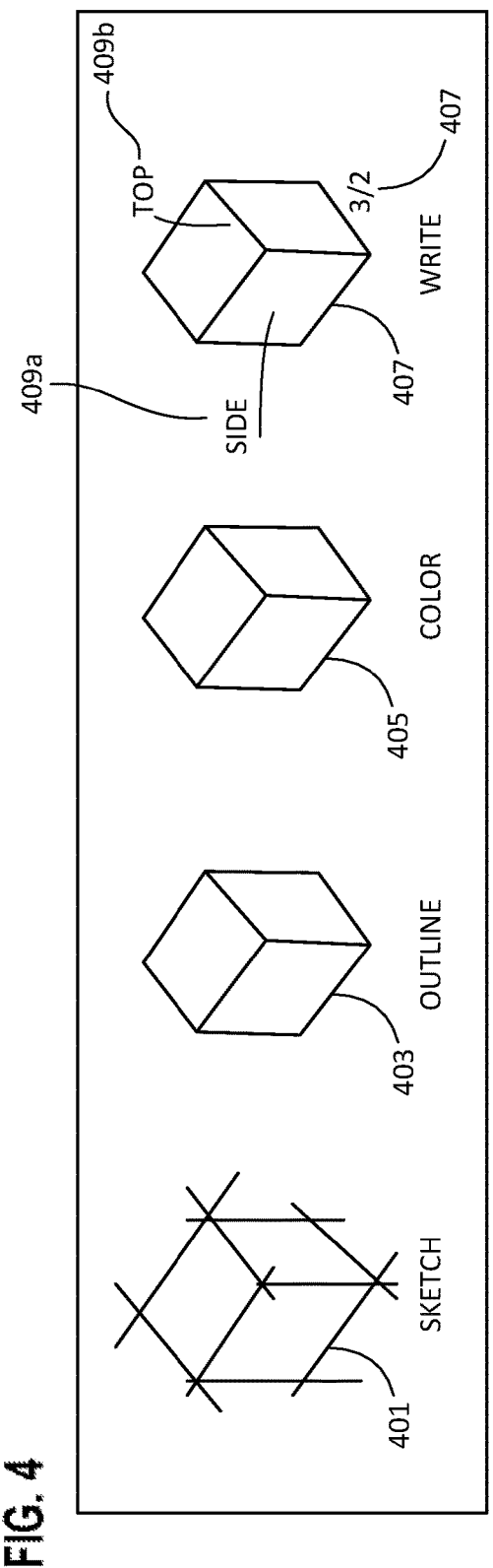
FIG. 4 is a schematic illustration of illustration activities, according to an embodiment.

FIG. 4 is a schematic illustration of illustration activities, according to an embodiment. A sketch 401 can include a freehand unfinished drawing. Additionally, parameters such as, for example, pressure, speed, tilt, angle, color and color blending associated with sketching can be applied by the illustration module 205 and affect the data representing sketch 401. The data representing sketch 401 can be stored in data store 207, on a local memory of the computing device 101, or anywhere throughout the communication network 105. The data representing sketch 401 can be used as a basis for other content types such as, for example, outlining, drawing, coloring, writing, etc. An outline 403 can be formed by marking outer contours of boundaries of a drawn object (e.g., the cube in FIG. 4). In some embodiments, a filtering can be applied to an outlining content type to, for example, define an outline to override data elements, colors, lines, etc. In other embodiments, various filters can be applied to define data representing transparent outlines, opaque outlines, etc. Additionally, parameters such as, for example, pressure, speed, tilt, angle, color, and color blending associated with outlining can be applied by the illustration module 205 and affect data representing outline 403. The data representing outline 403 can be stored in data store 207, on a local memory of the computing device 101, or anywhere throughout the communication network 105. The data representing outline 403 can be used as a basis for other content types such as, for example, coloring, writing, etc.

A coloring 405 can be formed by filling a drawn object with a color or a blend of colors. In some embodiments, a filtering can be applied to a coloring content type to for example, define a color to override data elements, other colors, lines, etc. In other embodiments, various filters can be applied to define transparent colors, opaque colors, etc. Additionally, parameters such as, for example, pressure, speed, tilt, angle, and color blending associated with coloring can be applied by the illustration module 205 and affect data representing coloring 405. The data representing coloring 405 can be stored in data store 207, on a local memory of the computing device 101, or anywhere throughout the communication network 105. The data representing coloring 405 can be used as a basis for other content types such as, for example, writing, etc.

A writing 407 can be formed by writing text similar to writing with pen and paper. In some embodiments, a filtering can be applied to a writing content type to, for example, define a writing to override data elements, other writings, lines, colors, etc. In other embodiments, various filters can be applied to define transparent writings, opaque writings, etc. Additionally, parameters such as, for example, pressure, speed, tilt, angle, color, and color blending associated with writing can be applied by the illustration module 205 and affect the data representing writing. The data representing writing 407 can be stored in data store 207, on a local memory of the computing device 101, or anywhere throughout the communication network 105. The data representing writing 407 can be used as a basis for other content types such as, for example, outlining, artistic calligraphy, etc. In various embodiments, sketching outputs, outlining outputs, coloring outputs, writing outputs, etc. can be combined to produce new illustrations. For example, illustration 407 shows a combination of sketching (401), outlining (403), coloring (405) and writings (409a, 409b, 409c).

Figure 5A:
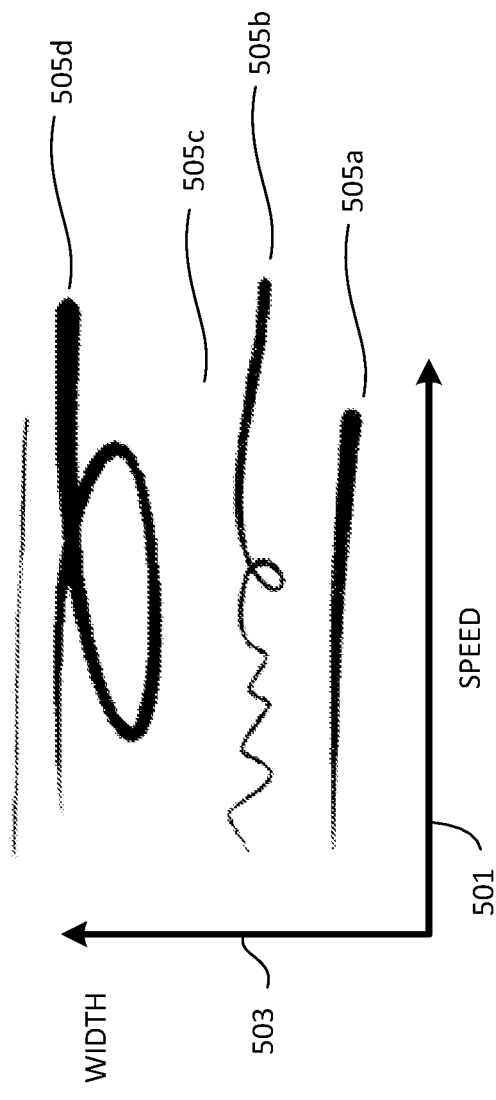
FIGS. 5A-5C are schematic illustrations of drawing lines with varying line widths, according to different embodiments.
Figure 5C:
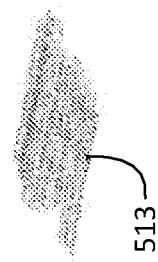
Figure 5B:
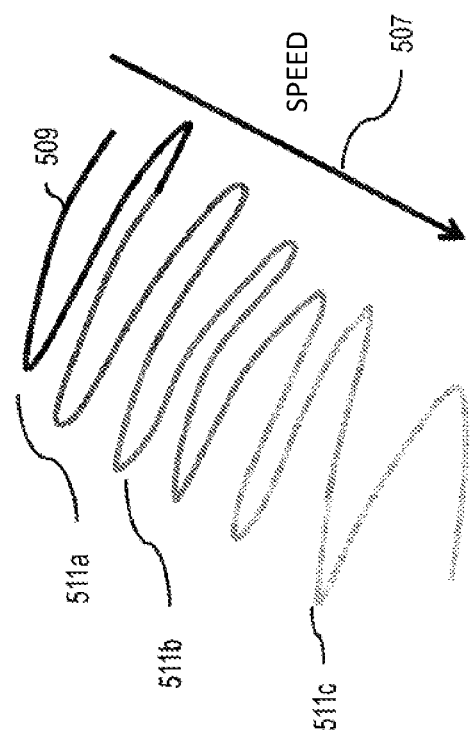

FIGS. 5A-5C are schematic illustrations of drawing lines with varying line widths, according to different instances. In some instances, value of a in the filtering formula (1), as described with regards to FIG. 2, can be set by the interpolation module 203 such that the thickness and smoothness of a drawn curve (e.g., a curve with a content type drawing) is controlled by the user of the computing device 101. For example, the value of a can be set at a constant value.

Furthermore, the thickness of a curve can vary to provide a sense of expression similar to the way a user can draw with pen and paper. In some embodiments, the expression is accomplished by scaling a width of a curve proportionally to a speed of drawing (e.g., speed of movement of a digital pen or finger on a UI 107). FIG. 5A shows a tapering effect of drawing speed on the thickness of a line or curve. As seen in FIG. 5A, axis 501 represents drawing speed and axis 503 represents the width or thickness of a line or curve drawn. As drawing speed increases along the axis 501. The thickness of curves 505a, 505b, 505c, and 505d increases. In some embodiments, the data preparation module 201 can store a value of a speed parameter for each data element of curves 505a-505d. The interpolation module 203 and/or the illustration module 205 can use the values of the speed parameter when interpolating and/or refining the set of data elements representing curves 505a-505d as drawing content type.

In some instances, an opacity parameter can be associated with data elements for sketching content type, such that the opacity of a sketch can vary proportional to a speed with which the sketch is being drawn. An example of an illustration formed with varying opacity based on speed is shown in FIG. 5B. As seen in FIG. 5B, as drawing speed of curve 509 increases along the axis 507, the opacity of the curve 509 also increases. At lower speeds, the area 511a of curve 509 is dark, as the speed increases area 511b becomes more opaque compared to 511a and area 511c becomes more opaque than 511b. In some instances, a sketch can be drawn based on a random jittering (e.g., deviation) function. As seen in hatching 513 of FIG. 5C, random sketching or jittering can causes the line to darken and accumulate as the sketching is randomly performed.

The data preparation module 201 can store a value of a speed parameter for each data element of a curve 509. The interpolation module 203 and/or the illustration module 205 can use the values of the speed parameter when interpolating and/or refining the set of data elements representing curve 509 as a sketching content type. Furthermore, the illustration module 205 can use a jittering function to determine darkness of sketch 513 based on sketching speed and/or accumulation of ink due to overlaps.

Figure 6:
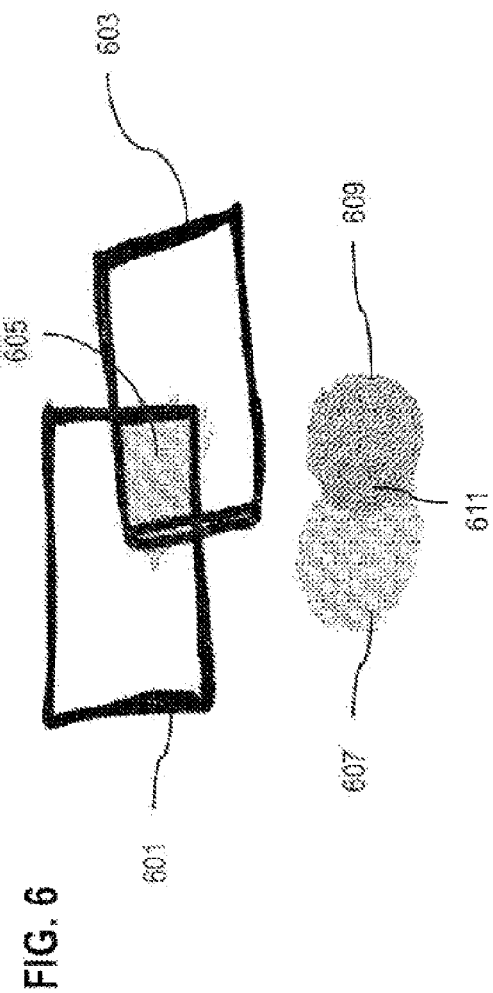
FIG. 6 is an illustration of outlining and color blending, according to an embodiment.

FIG. 6 is an illustration of outlining and color blending, according to an embodiment. An illustration with an outlining content type as typically done with a marker can have a relatively constant sized line width. The colors of outlining and the area being outlined, however, can blend to produce a darkened appearance. For example, the outlining can have an effect that black lines remain black, even when the lines are painted over by a brighter color. As seen in FIG. 6, the square shapes 601 and 603 are outlined and square 605 has been colored such that the color has painted over the outlines of square 605, for example by the illustration module 205. The outlined sides of square 605, however, remained black overriding the painted over colors. In some instances, an opacity parameter can be associated with the data elements based on the content type such as, for example, data elements with an outlining content type receive a low opacity parameter such that the outline data elements override other data elements (e.g., colors).

In some instances, values of a blend parameter are automatically associated with the data elements. In such instances, colors can be blended by the digital illustration platform 200 to replicate the appearance of colors blending in nature (e.g., yellow and blue blend into green) while dark lines remain dark. As seen in FIG. 6, the colored areas 607 and 609 have an overlap area 611. The color of area 611 is automatically defined by the illustration module 205 as a blend of colors of areas 607 and 609.

Figure 7:
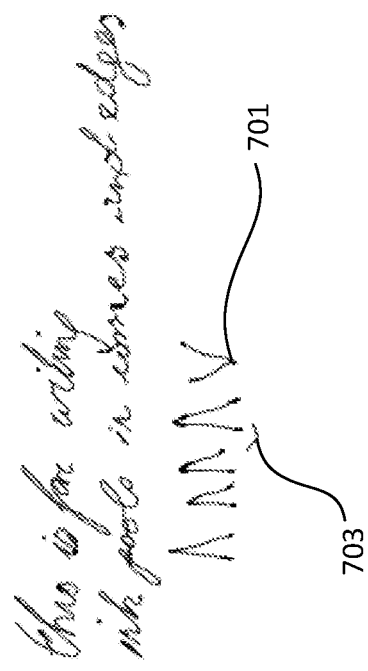
FIG. 7 is an illustration of ink pooling effect, according to an embodiment.

FIG. 7 is an illustration of ink pooling effect, according to an embodiment. In some instances, data elements with a writing content type can be represented as typical writing with pen and paper appears. A typical writing, for example, with a roller-ball pen is accomplished through a thinner line style. A weight of the lines can be changed to the inverse of the writing speed, for example, by the illustration module 205. Therefore, when a user draws slowly, the line thickens. As seen in FIG. 7, this can produce a visual effect of ink pooling in corners and turns (e.g., 701 and 703), giving writing a natural and expressive quality.

Figure 8:
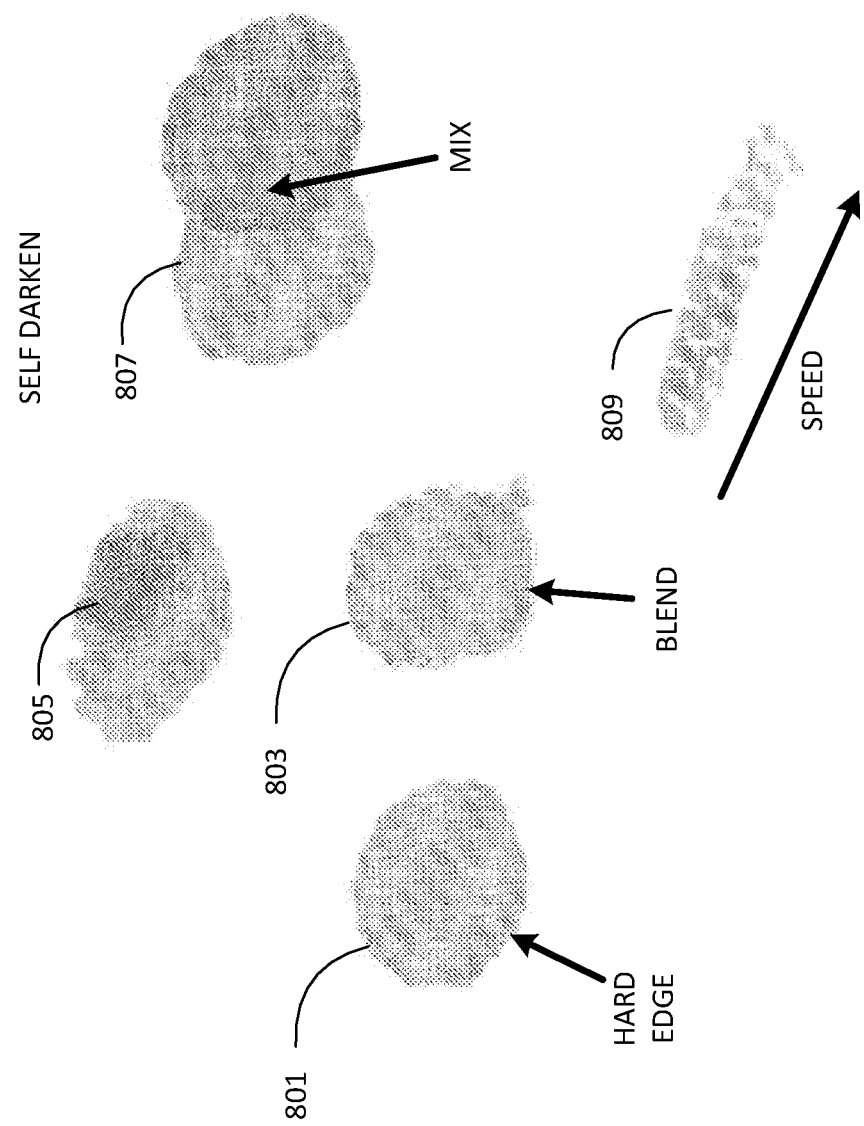
FIG. 8 is an illustration of multi-layered stroke coloring, according to an embodiment.

FIG. 8 is an illustration of multi-layered stroke coloring, according to an embodiment. In some embodiments, the digital illustration platform 200 enables a user of a computing device 101 to perform a coloring illustration. The coloring can be similar to water-coloring with brush on paper. In some embodiments, the illustration module 205 blends colors using a multiplicative relationship. Thus, a color drawn over the same color can self darken, as shown in 805. Furthermore, as seen in 807, colors of different hue can mix.

In some instances, the illustration module 205 can provide a multi-layered stroke feature. A multi-layered stroke feature enables a user of a computing device 101 to draw with multiple strokes simultaneously. Thus, an effect of ink bleed can be produced, where a value of the pigment of ink is controlled by one stroke and a value of the edge of the color is controlled by another stroke. In some embodiments, an edge stroke can maintain a hard edge as seen in 801. The edge stroke can be combined with a fill stroke with variable opacity based on values of the speed of the user input. Thus, a user can draw a hard edged color as shown in 801, blend as shown in 803, or transparent as seen in 809. The values of the varying opacity can be controlled by the illustration module 205 by, for example, maintaining values of the opacity for the edge stroke at a constant value and varying values of the opacity of the fill stroke based on speed of the user input. The data associated with the edge stroke and the fill stroke such as, for example, opacity values, can then be combined using a multiply operator. The effect can be that as a user draws faster, the edge shape is larger and the fill turns transparent causing an effect similar to a color-bleed. In some instances, the illustration module 205 can use image processing operations to enhance the presentation by, for example, enhancing or modifying values of contrast, hue, or other parameters.

Any number of strokes and combinations (e.g., illustration layers) can be used and controlled by the digital illustration platform 200. For example, the digital illustration platform 200 can associate various parameters such as, for example, speed of movement, pressure, angle or tilt to multiple illustration layers simultaneously. Thus, different strokes (user input) can have various values of parameters that affect the output associated with the user input.

In some embodiments, the digital illustration platform 200 can use a bitmap mask for providing digital illustrations. For example, a mask can be drawn in a single gray color and layers of masks can be used as an alpha channel for defining color transparency.

In some embodiments, the digital illustration platform 200 can select appropriate blend mode automatically based on a content type. For example, content types drawing, writing, and sketching can be associated with normal blend mode, while content type outline is associated with darken blend mode, as discussed with regards to FIG. 6. Similarly, a coloring content type can be associated with a multiplicative blending, as discussed with regards to FIG. 8.

Figure 9:
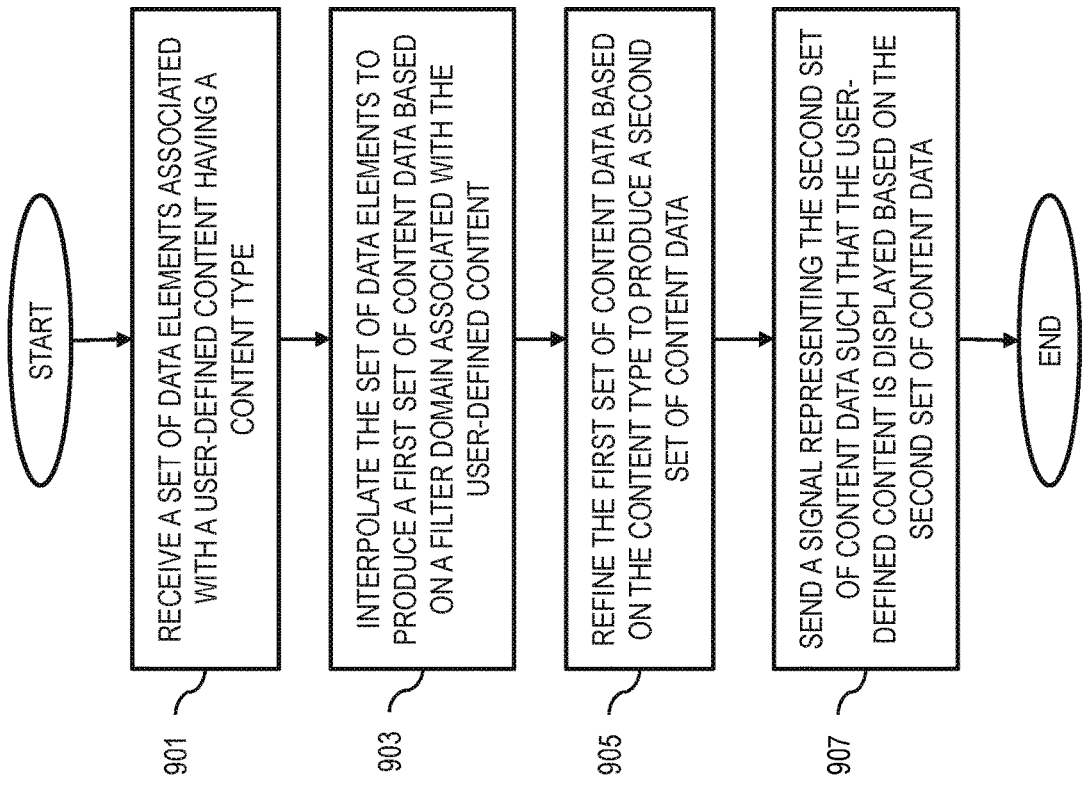
Figure 10:
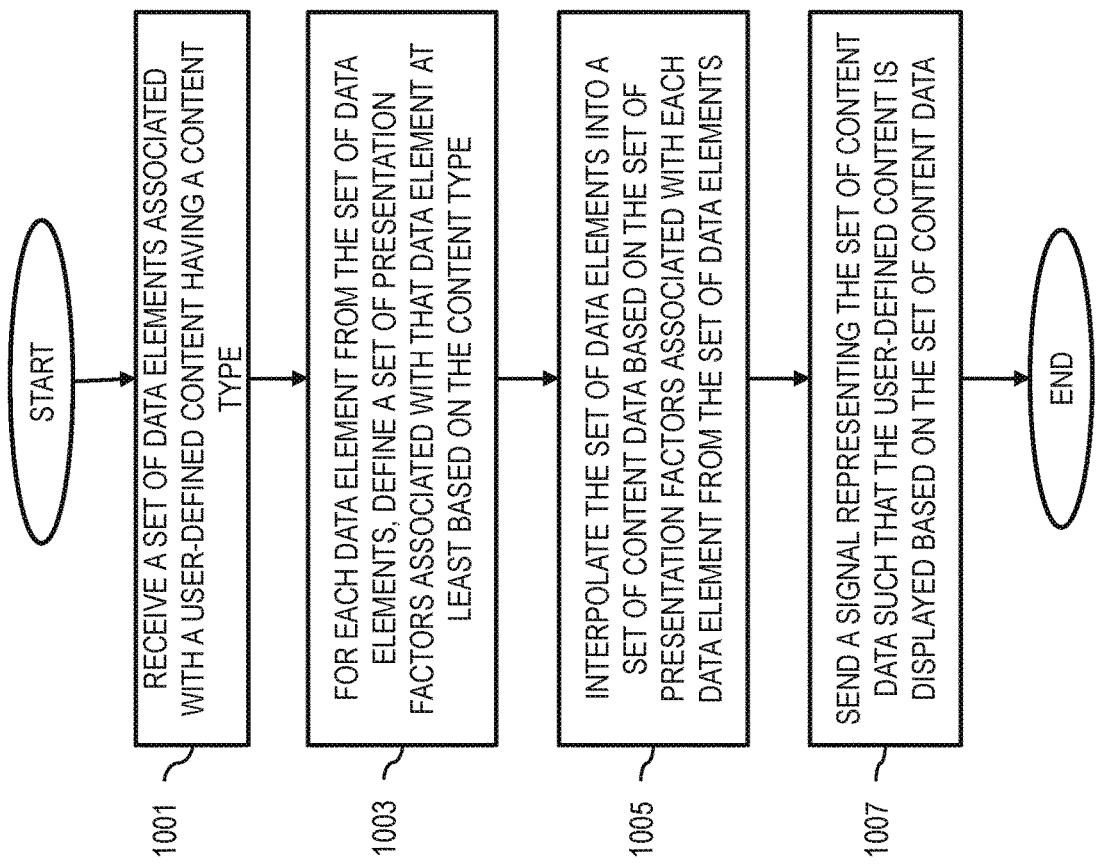

FIGS. 9-11 are flowcharts of processes for providing digital illustration functions, according to various embodiments. FIG. 9 shows a flowchart of digital illustration process based on a filter domain. At 901, a set of data elements associated with a user-defined content is received, for example, by a digital illustration platform 200 from a computing device 101, via an input signal 209. The user-defined content has a content type such as, for example, drawing, sketching, writing, outlining, coloring, etc. In some instances, a user of a computing device 101 can select a content type from a list of available content types provided by the digital illustration platform 200. In other instances, the digital illustration platform 200 can infer a content type from the data elements associated with user input such as, for example, speed, pressure, color, etc. The set of data elements can be stored in a data store such as, for example, a data store 207, and/or in a local memory of the computing device 101.

At 903, the set of data elements are interpolated, for example by an interpolation module 203, to produce a first set of interpolated data based on a filter domain associated with the user-defined content. The interpolation can produce a continuous set of interpolated data based on the received data elements and based on the filter domain. The filter domain can define limitations on the domain that interpolated data is selected from.

At 905 the first set of interpolated data is refined, for example by an illustration module 205, and based, at least in part, on the content type to produce a second set of interpolated data. The refinement process can, for example, produce line thickness, opacity, color blend, etc. as discussed with regards to FIGS. 3-8.

At 907, a signal is sent, for example by the digital illustration platform 200 via an output signal 211, to represent the second set of interpolated data, for example on a UI 107 of a computing device 101. The representation of the second set of interpolated data can include displaying of the user-defined content based on the second set of interpolated data.

In some instances, the filter domain can be defined based on at least one filter including a temporal filter or a spatial filter as discussed with regards to FIG. 2. Additionally/alternatively, the filter domain can be defined based on parameters associated with the data elements. As previously discussed, the parameters can include an input color indicator of the user-defined content, an input speed indicator of the user-defined content, an input pressure indicator of the user-defined content, an input tilt indicator of the user-defined content, an input angle indicator of the user-defined content, etc.

In some instances, a set of presentation factors is defined for each data element from the set of data elements based on at least the content type. The interpolation of the data elements can be performed based on the set of presentation factors. The set of presentation factors can include, for example, masking, color blending, etc., as previously discussed.

In some instances, the set of data elements is from multiple sets of data elements associated with a multi-layered user-defined content, such that each set of data elements from the multiple sets of data elements is associated with a layer of the multi-layered user-defined content. In such instances, the digital illustration of sets of data elements can be performed simultaneously for various layers of user-defined content. Furthermore, the illustration results (e.g., the second set of content data) can be represented simultaneously.

FIG. 10 shows a flowchart of digital illustration process based on presentation factors. At 1001, a set of data elements associated with a user-defined content is received, for example, by a digital illustration platform 200 from a computing device 101, via an input signal 209. The user-defined content has a content type such as, for example, drawing, sketching, writing, outlining, coloring, etc. The set of data elements can be stored in a data store such as, for example, a data store 207, and/or a local memory of the computing device 101.

At 1003, for each data element from the set of data elements, a set of presentation factors associated with that data element is defined, for example, by a data preparation module 201, at least based on the content type. For example, if the content type is drawing a bitmap masking value can be defined; or if the content type is outlining, a darken blend mode can be defined as a presentation factor.

At 1005, the set of data elements are interpolated, for example, by an interpolation module 203, into a set of interpolated data based on the set of presentation factors associated with each data element from the set of data elements. The presentation factors can define limitations on the illustration of the interpolated data.

At 1007, a signal is sent, for example, by the digital illustration platform 200 via an output signal 211, to represent the set of interpolated data, for example on a UI 107 of a computing device 101. The representation of the set of interpolated data can include displaying of the user-defined content based on the set of interpolated data.

In some instances, if the content type is drawing, for each data element from the set of data elements, a value of a speed indicator associated with the data element is received. Additionally, a value of a smoothing factor associated with the data element is received, for example at a digital illustration platform 200 from a computing device 101. The values of the speed indicator and/or the smoothing factor can be determined, for example, based on the speed and/or the smoothness with which a user of the computing device 101 draws a shape (e.g., with or without shaky hands) on a UI 107 of the computing device 101. In some instances, a value of a thickness indicator associated with the data element is defined based on the value of the speed indicator. For example, the value of the thickness indicator can be defined as a function of the value of the speed indicator such that a line thickness of the drawing increases as the drawing speed increases (as seen in FIG. 5A). In some instances, a value of a smoothness indicator associated with the data element is defined based on the smoothing factor. For example, the value of the smoothness indicator can be defined as a function of the smoothing factor such that a line smoothness of the drawing increases as the value of the smoothness indicator increases. The value of the smoothness indicator can represent a smoothness with which a user of the computing device 101 draws a shape (e.g., with or without shaky hands). In some instances, the value of the thickness indicator and the value of the smoothness indicator are added to the set of presentation factors associated with the data element before the set of data elements is interpolated into a set of interpolated data.

In some instances, if the content type is sketching, for each data element from the set of data elements, a value of a speed indicator associated with the data element is received. Additionally, a value of a jittering indicator associated with the data element is received, for example at a digital illustration platform 200 from a computing device 101. The value of the jittering indicator represents jittering movements with which a user of the computing device 101 draws a sketch (e.g., performs hatching) on a UI 107 of the computing device 101. In some instances, a value of an opacity indicator associated with the data element is defined based on the value of the speed indicator. For example, the value of the opacity indicator can be defined as a function of the speed indicator such that the opacity of a hatching area increases as the hatching speed increases (as seen in FIG. 5B). In some instances, a value of a darkness indicator associated with the data element is defined based on the value of the jittering indicator. For example, the value of the darkness indicator can be defined as a function of the value of the jittering indicator such that the darkness of the hatching increases as the value of the jittering indicator increases (e.g., hatching is repeatedly performed over the same area) (as seen in FIG. 5C). In some instances, the values of the opacity indicator and the darkness indicator are added to the set of presentation factors associated with the data element before the set of data elements is interpolated into a set of interpolated data.

In some instances, if the content type is outlining, the set of presentation factors can include a blend mode. The blend mode can define how the outlining illustration is blended with other data elements. In such instances, for each data element from the set of data elements, a value of a thickness indicator associated with the data element is received. In some instances, a value of a blending indicator associated with the data element is defined based on the blend mode using a blending function. For example, the value of the blending indicator can be defined as a function of the blending mode such that the outline color overrides any other colors, or the outline color is transparent and dissolves into other colors, etc. (as seen in FIG. 6). In some instances, a value of a color indicator associated with the data element is defined based on the value of the blending indicator. For example, the value of the color indicator can be defined as a function of the value of the blending indicator such that the color of the outline changes based on other colors (e.g., the outline color blends with other colors and produces new colors) (as seen in FIG. 6). In some instances, the values of the thickness indicator and the color indicator are added to the set of presentation factors associated with the data element before the set of data elements is interpolated into a set of interpolated data.

In some instances, if the content type is coloring, the set of presentation factors can include a blend mode. The blend mode can define how the colors are blended in a coloring illustration. In such instances, for each data element from the set of data elements, a value of a blending indicator associated with the data element is defined based on the blend mode using a multiplicative relationship. For example, the value of the blending indicator can be defined as a function of the blending mode such that one color overrides other colors, one color is transparent and dissolves into other colors, colors blends with other colors and produce new colors, etc. (as seen in FIG. 8). In some instances, the value of the blending indicator is added to the set of presentation factors associated with the data element before the set of data elements is interpolated into a set of interpolated data.

In some instances, if the content type is writing, for each data element from the set of data elements, a value of a thickness indicator associated with the data element is received. Additionally, a value of a speed indicator associated with the data element is received, for example, at a digital illustration platform 200 from a computing device 101. The value of the speed indicator can be determined, for example, based on a speed with which a user of the computing device 101 writes on a UI 107 of the computing device 101. In some instances, the value of the thickness indicator associated with the data element is defined based on the value of the speed indicator. For example, the value of the thickness indicator can be defined as a function of the value of the speed indicator such that a writing thickness increases as the drawing speed increases (as seen in FIG. 7). In other instances, the value of the thickness indicator can be given as a constant thickness (e.g., associated with a pen type). In some instances, a value of a weight indicator associated with the data element is defined based on the value of the speed indicator. For example, the value of the weight indicator can be defined as a function of the value of the speed indicator such that the ink heaviness with which a text is being written increases as the speed decreases (e.g., the value of the weight indicator is inversely proportional to the value of the speed indicator). In some instances, the value of the thickness indicator and the value of the weight indicator are added to the set of presentation factors associated with the data element before the set of data elements is interpolated into a set of interpolated data.

FIG. 11 shows a flowchart of digital illustration process for multi-layered illustrations. At 1101, multiple sets of data elements associated with a multi-layered user-defined content are received, for example by a digital illustration platform 200. Each set of data elements from the multiple sets of data elements is associated with a layer of the multi-layered user-defined content.

At 1103, a first set of presentation factors associated with a first set of data elements from the multiple sets of data elements is defined. The first set of presentation factors is associated with a first layer of the multi-layered user-defined content.

At 1105, a second set of presentation factors associated with a second set of data elements from the multiple sets of data elements is defined. The second set of presentation factors is associated with a second layer of the multi-layered user-defined content. The first set of presentation factors and the second set of presentation factors are defined as discussed with regards to FIG. 10. For example, the first set of presentation factors can be associated with a pigment and the second set of presentation factors can be associated with an edge to produce a color-bleeding effect for the presentation.

In some instances, each layer of the multi-layered user-defined content can have a content type. In such instances, the first set of presentation factors and the second set of presentation factors can be defined based, at least in part, on the content type for the respected layer.

At 1107, the first set of data elements and the second set of data elements are interpolated to produce a set of interpolated data associated with the first layer of the multi-layered content and the second layer of the multi-layered content, based on the first set of presentation factors and the second set of presentation factors. The interpolation process previously discussed with regards to FIGS. 9 and 10.

At 1109, a signal is sent to represent the set of interpolated data such that the multi-layered user-defined content is displayed based on the set of interpolated data.

In some instances, a layer of the multi-layered content is a masking layer. In such instances, an alpha channel can be defined based on the masking layer and the set of data elements can be interpolated based on the alpha channel, as previously discussed.

In some instances, a third set of data elements from the multiple sets of data elements is associated with a filling stroke. In such instances, a value of a speed indicator associated with the third set of data elements can be received. In some instances, a value of an opacity indicator associated with the third set of data elements is defined, based on the value of the speed indicator, as previously discussed. Furthermore, a third set of presentation factors associated with the third set of data elements from the multiple sets of data elements is defined, based on the value of the opacity indicator. In some instances, the third set of data elements is interpolated based on the third set of presentation factors.

In some instances, the first set of presentation factors, the second set of presentation factors and the third set of presentation factors can be defined at least based on a value of an input speed indicator of the multi-layered user-defined content, a value of an input pressure indicator of the multi-layered user-defined content, a value of an input angle indicator of the multi-layered user-defined content, or a value of an input tilt indicator of the multi-layered user-defined content.

It is intended that the methods and apparatus described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein.

What is claimed is:

1. A non-transitory computer-readable storage medium having computer-readable instructions stored thereon, the computer-readable instructions configured to instruct a processor to:

receive, from a touchscreen sensor of a touchscreen, a set of data elements indicating at least one line or curve responsive to a detection of at least one hand-drawn stroke of a digital pen or a finger drawing the at least one line or curve across a user interface of the touchscreen, the set of data elements further comprising detected speeds of the hand-drawn stroke of the digital pen or the finger detected by the touchscreen sensor as the digital pen or the finger draws the at least one line or curve;

interpolate the set of data elements to produce content data based on presentation factors of a content type associated with the hand-drawn stroke, the presentation factors defined based, at least in part, on parameters associated with the set of data elements, the parameters including at least an input speed indicator of the hand-drawn stroke indicating a detected speed of the hand-drawn stroke, wherein the presentation factors comprise a thickness indicator defined for the content type as a function of the detected speed such that a writing thickness increases as the drawing speed increases;

generate an adjusted version of the at least one line or curve from the content data produced based on the presentation factors of the content type, the adjusted version of the at least one line or curve including at least one of the writing thickness or an opacity that changes based on the detected speeds of the at least one stroke, wherein as the detected speeds increase along the at least one line or curve, the writing thickness of the adjusted version of the at least one line or curve increases; and send a signal to the touchscreen instructing the touchscreen to display the adjusted version of the at least one line or curve in the user interface, wherein the adjusted version of the at least one line or curve is displayed as a continuous stroke of hand-drawn content whose width increases proportionally to the detected speeds.

2. The non-transitory computer-readable storage medium of claim 1, wherein the set of data elements comprises multiple sets of data elements indicating multiple hand-drawn strokes organized into a multi-layered content.

3. The non-transitory computer-readable storage medium of claim 2, wherein the computer-readable instructions are further configured to instruct the processor to define:

a first set of presentation factors associated with a first set of data elements from the multiple sets of data elements and associated with a first layer of the multi-layered content; and a second set of presentation factors associated with a second set of data elements from the multiple sets of data elements and associated with a second layer of the multi-layered content.

4. The non-transitory computer-readable storage medium of claim 1, wherein the received set of data elements includes the content type indicating a content with which data elements from the set of data elements are associated.

5. The non-transitory computer-readable storage medium of claim 4, wherein the content type includes at least one content type selected from the group consisting of lines, colors, letters, shapes, and hatchings.

6. The non-transitory computer-readable storage medium of claim 1, wherein the computer-readable instructions are further configured to instruct the processor to vary the opacity of the adjusted version of the at least one line or curve defined by the hand-drawn user inputs based on the detected speed of the at least one stroke.

7. The non-transitory computer-readable storage medium of claim 6, wherein as the detected speeds increase along the at least one stroke, the opacity of the adjusted version of the at least one line or curve decreases.

8. The non-transitory computer-readable storage medium of claim 1, wherein the computer-readable instructions are further configured to instruct the processor to use a jittering function to determine darkness of a sketch defined by the at least one stroke based on the detected speed of the at least one stroke.

9. A method of operating a software program for a digital illustration system, the method comprising:
receiving, from a touchscreen sensor of a touchscreen, a set of data elements comprising at least one line or curve responsive to a detection of at least one hand-drawn stroke of a digital pen or a finger drawing the at least one line or curve across a user interface of the touchscreen, the set of data elements further comprising detected speeds of the hand-drawn stroke of the digital pen or the finger detected by the touchscreen sensor as the digital pen or the finger draws the at least one line or curve;
interpolating the set of data elements to produce content data based on presentation factors of a content type associated with the hand-drawn stroke, the presentation factors defined based, at least in part, on parameters associated with the set of data elements, the parameters including at least an input speed indicator of the hand-drawn stroke content indicating a detected speed of the hand-drawn stroke, wherein the presentation factors comprise a thickness indicator defined for the content type as a function of the detected speed such that a writing thickness increases as the drawing speed increases;
generating an adjusted version of the at least one line or curve from the content data produced based on the presentation factors of the content type, the adjusted version of the at least one line or curve including at least one of the writing thickness or an opacity that changes based on the detected speeds of the at least one stroke, wherein varying the writing thickness of the adjusted version of the at least one line or curve comprises increasing the writing thickness as the detected speeds increase; and
sending a signal to the touchscreen instructing the touchscreen to display the adjusted version of the at least one line or curve in the user interface, wherein the adjusted version of the at least one line or curve is displayed as a continuous stroke of hand-drawn content whose width increases proportionally to the detected speeds.

10. The method of claim 9, wherein generating an adjusted version of the at least one line or curve comprises varying the opacity of the adjusted version of the at least one line or curve based on the detected speeds of the at least one stroke.

11. The method of claim 10, wherein varying the opacity of the adjusted version of the at least one line or curve comprises decreasing the opacity along the adjusted version of the at least one line or curve as the detected speeds increase along the at least one stroke.

12. The method of claim 9, further comprising storing values of a speed parameter associated with the detected speeds for data elements of the received set of data elements.

13. A computing device configured to execute a digital illustration software program, the computing device comprising:
a processor; and
a memory storing the digital illustration software program that when executed by the processor configures the computing device to:
process at least one hand-drawn line or curve detected by a touchscreen sensor of a touchscreen of the computing device responsive to a digital pen or a finger moving across the touchscreen to define the at least one hand-drawn line or curve;
detect the speed of the digital pen or the finger at a plurality of points along the at least one hand-drawn line or curve as the digital pen or the finger moves across the touchscreen to define the at least one hand-drawn line or curve;
interpolate the set of data elements to produce content data based on presentation factors of a content type associated with the at least one hand-drawn line or curve, the presentation factors defined based, at least in part, on parameters associated with the set of data elements, the parameters including at least an input speed indicator indicating a detected speed of the at least one hand-drawn line or curve, wherein the presentation factors comprise a thickness indicator defined for the content type as a function of the detected speed such that a writing thickness increases as the drawing speed increases;
generate an adjusted version of the at least one hand-drawn line or curve from the content data produced based on the presentation factors of the content type, the adjusted version of the at least one hand-drawn line or curve including at least one of the writing thickness or an opacity that varies at the plurality of points based on the detected speed of the digital pen or the finger at the plurality of points, wherein the digital illustration software program is configured to vary the writing thickness of the at least one hand-drawn line or curve proportionally to the detected speed of the digital pen or the finger to generate the adjusted version of the at least one hand-drawn line or curve; and
control the touchscreen to display the adjusted version of the at least one hand-drawn line or curve as the digital pen or the finger moves across the touchscreen rather than displaying the hand-drawn line or curve as originally detected by the touchscreen, wherein the adjusted version of the at least one hand-drawn line or curve is displayed as a continuous stroke of hand-drawn content whose width increases proportionally to the detected speeds.

14. The computing device of claim 13, wherein the digital illustration software program further configures the computing device to vary the opacity of the at least one hand-drawn line or curve inversely proportionally to the detected speed of the digital pen or the finger to generate the adjusted version of the at least one hand-drawn line or curve.

\* \* \* \* \*